United States Patent Office 3,096,143
Patented July 2, 1963

3,096,143
TANNING WITH SILICATED SODIUM
ZIRCONYL SULFATE
Robert V. Horrigan, Penn Yan, N.Y., assignor to National Lead Company, New York, N.Y., a corporation of New Jersey
No Drawing. Filed Aug. 21, 1961, Ser. No. 132,561
10 Claims. (Cl. 8—94.25)

This invention is concerned with zirconium tannage and products useful therefor.

It is an object of the invention to provide a novel, inexpensive zirconium material for tanning.

Another object of the invention is to provide a simple and inexpensive zirconium tanning process utilizing a novel zirconium material.

A further object of the invention is to provide inexpensive zirconium-tanned leather.

Additional objects and advantages of the invention will be apparent from the following description thereof.

It has been known for many years that certain zirconium compounds have utility in tanning hides, skins and the like to form leather. Although such compounds have been used to some extent, their relatively high cost as compared to chrome-tanning materials has prevented widespread use. Indeed, the use of zirconium tanning agents has been limited substantially to the production of expensive white or very light colored leathers.

By the present invention a zirconium tanning agent that approaches chrome-tanning agents in cost can be produced and used. Thus, the way is opened to extensive production of light-colored, permanently tanned leathers and many finishing problems may be avoided.

The most common and widely used zirconium ore is zircon, zirconium silicate. Zircon is substantially insoluble in acids. Soluble zirconium chemicals are, therefore, prepared by indirect methods which in most cases are relatively expensive.

It has now been found that a water-soluble zirconium product useful for tanning can be prepared at low cost in two simple steps. In the first step, finely divided zircon is roasted with an approximately equimolar amount of sodium carbonate to produce sodium zirconium silicate. In the second step, the dry sodium zirconium silicate is mixed with concentrated sulfuric acid in a ratio of from 1.5 to 2.2 moles of $H_2SO_4$ per mole of sodium zirconium silicate. A vigorous exothermic reaction results and a dry, crumbly product is product. The reaction product obtained is complex and not susceptible to precise description in chemical terms. It has been found, however, that these products contain water soluble zirconium products equivalent to from about 24% to about 30% $ZrO_2$ and from about 1% to about 5% water soluble silica, the remainder of the silica being insoluble and non-gelatinous. For convenience, the dry product obtained from the second process step described above will hereinafter be referred to as "silicated sodium zirconyl sulfate." It will be understood that this term is not intended to describe accurately the chemical nature of the products, but only to identify them conveniently. As hereinafter described in detail, aqueous systems of silicated sodium zirconyl sulfate are very useful in tanning.

In the first step of the process, in which sodium zirconium silicate is produced, it is preferred to use a substantially equimolar mixture of soda ash and zircon. The use of a substantial excess of zircon will, of course, result in incomplete conversion while any substantial excess of soda ash tends to make the product unnecessarily and usually undesirably alkaline. The temperature of reaction may vary between about 1000° C. and 1400° C. Temperatures in the upper part of this range are preferred since completeness and speed of the reaction are increased thereby. An oxidizing atmosphere is usually employed and the reaction usually takes from about 1 to 4 hours, depending on the temperature.

The production of sodium zirconium silicate, is illustrated in the following two examples.

EXAMPLE 1

625 parts of finely divided zircon (all passing through a 325 mesh screen) were intimately mixed with 375 parts of sodium carbonate (commercial soda ash) and calcined for 3½ hours at 1345° C. 840 parts of sodium zirconium silicate which analyzed 48.3% $ZrO_2$, 25.6% $Na_2O$ and 24.1% $SiO_2$ were obtained. After cooling, the product was milled to —200 mesh size.

EXAMPLE 2

635 parts of finely divided zircon (all passing through a 325 mesh screen) were intimately mixed with 365 parts of sodium carbonate (commercial soda ash) and calcined for 3½ hours at 1290° C. 845 parts of sodium zirconium silicate were obtained. The product contained 49.5% $ZrO_2$, 25.0% $Na_2O$, and 24.7% $SiO_2$. After cooling, the product was milled to —200 mesh size.

In converting sodium zirconium silicate to silicated sodium zirconyl sulfate a ratio of from about 1.5 to 2.2 moles of $H_2SO_4$ per mole of sodium zirconium silicate may be employed, with the ratio preferably being from about 1.8:1 to about 2.2:1. The acid used should be concentrated to facilitate the production of a dry product. Although 66 Bé. acid has been found convenient and produces good results, acid of specific gravity as low as 63°–64° Bé., i.e. about 85% $H_2SO_4$ content, may be used and, of course, acid even more concentrated than 66° Bé. could be employed satisfactorily. While the reaction can be carried out conveniently in a pug mill mixer, other suitable means may be employed in mixing the acid and silicate. The reaction is markedly exothermic and the temperature of the reaction mass rises quickly to about 150° C.–260° C. if not controlled. In some cases, it has been found desirable to limit the temperatures attained by using a water-jacketed and cooled pug mill. Other cooling means could, of course, be used. Lower temperatures down to about 125° C. favor somewhat increased $H_2O$ content of the product and an increased proportion of soluble silica therein. Typical analyses of products shown compositions within the following ranges: 27%–31% $ZrO_2$ (24%–30% $ZrO_2$ in water soluble form); 13%–16% $SiO_2$ (1%–5% $SiO_2$ in water soluble form); 34%–40% $SO_3$; 13%–16% $Na_2O$; 0.5%–4% $H_2O$. When 63°–64° Bé. sulfuric acid is used with dry sodium zirconium silicates, the maximum possible water content of the resultant silicated sodium zirconyl sulfate is about 15%, but under the conditions of the reaction, a large part of the water is vaporized. The silicated sodium zirconyl sulfate products are non-gelatinous, dry, granular materials substantially free from silica gel and do not gel when added to water.

The production under varying conditions of silicated sodium zirconyl sulfate products within the range of composition set forth above is illustrated in the following examples.

EXAMPLE 3

The milled sodium zirconium silicate product obtained in Example 1 was mixed by vigorous agitation in a pug mill with 645 parts of 66° Bé. sulfuric acid. An exothermic reaction took place which rapidly raised the temperature of the mixture to 220° C. There was recovered after cooling 1400 parts of product (silicated sodium zirconyl sulfate) which was milled to —20 mesh size. Analysis of the product showed: 30.3% $ZrO_2$ (29.6% water soluble $ZrO_2$); 14.76% $SiO_2$ (3.4% water soluble $SiO_2$); 39.2% $SO_3$; 14.2% $Na_2O$; 1.04% $H_2O$.

EXAMPLE 4

The milled sodium zirconium silicate product from Example 2 was placed in a pug mill, equipped with a cooling jacket, and was there mixed with 650 parts of 66° Bé. sulfuric acid, vigorous agitation being used. The temperature of the mixture was increased as a result of the exothermic reaction but was limited to 165° C. by circulating water through the jacket of the mill. When the reaction mass had cooled, there was recovered 1475 parts of product (silicated sodium zirconyl sulfate). This product was milled to −20 mesh size. Analysis of the product showed: 29.0% $ZrO_2$ (25.46% water soluble $ZrO_2$); 15.1% $SiO_2$ (5.0% water soluble $SiO_2$); 39.15% $SO_3$; 14.9% $Na_2O$; 2.68% $H_2O$.

EXAMPLE 5

175 parts of 85% sulfuric acid were added with vigorous stirring to 250 parts of sodium zirconium silicate. The exothermic reaction resulted in the temperature of the mass rising to 155° C. Analysis of the 413 parts of product obtained showed: 29.1% $ZrO_2$ (27.0% water soluble $ZrO_2$); 13.9% $SiO_2$ (2.0% water soluble $SiO_2$); 34.8% $SO_3$; 15.1% $Na_2O$; 4.9% $H_2O$. The silicated sodium zirconyl sulfate product was dry and crumbly and was easily crushed to powder.

EXAMPLE 6

250 parts of sodium zirconium silicate were used and 204 parts of 85% sulfuric acid. These were agitated together with the temperature of the mix running up to about 150° C. Analysis of the 400 parts of silicated sodium zinconyl sulfate product showed: 27.8% $ZrO_2$ (27.0% water soluble $ZrO_2$); 14.4% $SiO_2$ (1.9% water soluble $SiO_2$); 36.1% $SO_3$; 14.5% $Na_2O$; 3.0% $H_2O$. The product was in appearance substantially like that of Example 5 and was substantially free of silica gel.

EXAMPLE 7

To 250 parts of sodium zirconium silicate was added 204 parts of 93% sulfuric acid. The mixture was stirred vigorously while the reaction took place, the temperature rising to above 150° C. The soft, crumbly, silicated sodium zirconyl sulfate product (415 parts) had by analysis: 29.2% $ZrO_2$ (26.9% water soluble $ZrO_2$); 14.6% $SiO_2$ (2.4% water soluble $SiO_2$); 37.6% $SO_3$; 15.4% $Na_2O$; 1.6% $H_2O$.

As previously pointed out, silicated sodium zirconyl sulfates are excellent tanning agents in aqueous systems. This is demonstrated in the following examples.

EXAMPLE 8

116.0 parts of drained kid skins, previously pickled to a pH of 1.8, were placed in a drum with 142 parts of water, 9.3 parts of sodium chloride and 16.2 parts of silicated sodium zirconyl sulfate. The latter contained 4.06 parts of soluble $ZrO_2$ and 0.55 part of soluble $SiO_2$. This is equivalent, per 100 parts of drained skins, to 14.0 parts of silicated sodium zinconyl sulfate containing 3.5 parts of soluble $ZrO_2$ and 0.47 part of soluble $SiO_2$. After drumming the skins for 3 hours, the shrink temperature of the skins was found to be 195° F. Then a solution containing 3.5 parts of anhydrous sodium acetate dissolved in 4.8 parts of water was added to the drum and rotation continued for 20 minutes. The pH of the drum contents was then adjusted by adding to the drum about 30 parts of an approximately 5.5% solution of sodium bicarbonate in water. The drumming was continued for about 20 minutes after the addition. The bicarbonate addition and drumming were repeated; and finally an addition of bicarbonate solution sufficient to raise the pH of the drum contents to between 4.5 and 5.0 was made with drumming being continued another 20 minutes. After standing overnight, the drum was drained and the tanned skins were horsed up, set out, shaved and then washed and drained. With the wet, tanned skins in a drum there was added thereto 174 parts of water and 0.58 part of anhydrous sodium citrate dissolved in 4.8 parts of water. After drumming for 30 minutes the skins were drained and prepared for fat liquoring and finishing in the usual way. After fat-liquoring it was found that the leather, on an air dried basis, had gained 6.92% in weight.

EXAMPLE 9

The procedure described in Example 8 was repeated, using, however, 19.8 parts of silicated sodium zirconyl sulfate (containing 5.0 parts of soluble $ZrO_2$ and 0.67 part of soluble $SiO_2$) per hundred parts of drained skins. The shrink temperature after tanning was found to be 199° F. and the fat-liquored leather showed a 19.2% gain in weight on an air dried basis.

EXAMPLE 10

The procedure described in Example 8 was repeated, using, however, 26.0 parts of silicated sodium zirconyl sulfate (containing 6.5 parts of soluble $ZrO_2$ and 0.88 part of soluble $SiO_2$) per 100 parts of drained skins. The tanned leather was found to have a shrink temperature of 202° F, and, after fat liquoring, the leather was found to have increased 27.1% in weight on an air dried basis.

Comparative tanning experiments were made with kid skins using, instead of silicated sodium zirconyl sulfate, the more expensive silica-free sodium zirconyl sulfate (which is actually disodium disulfatozirconate dihydrate) in amounts equivalent in soluble $ZrO_2$ to those used in Examples 8–10. The results of these experiments as compared to the experiments using the silicated material are shown in the following table. Silicated sodium zirconyl sulfate is designated "SSZS" while the silica-free product is designated "SZS."

*Table A*

| Tanning Agent | Soluble $ZrO_2$, parts per 100 pts. skins | Amt. of Agent, parts per 100 pts. skins | Shrink Temp. after tanning but prior to neutralizing, °F. | Wt. Increase after fat liquoring, air dried basis, percent |
|---|---|---|---|---|
| SSZS | 3.5 | 14.0 | 195 | 6.92 |
| SZS | 3.5 | 10.5 | 190 | 6.42 |
| SSZS | 5.0 | 19.8 | 199 | 19.2 |
| SZS | 5.0 | 15.6 | 194 | 13.2 |
| SSZS | 6.5 | 26.0 | 202 | 27.1 |
| SZS | 6.5 | 20.3 | 195 | 25.3 |

It will be evident that in each of the three comparisons with equivalent amounts of soluble zirconia the silicated product produced superior results both in shrink temperature attained and weight increase of the leather. It is believed that the improved shrink temperature is due to the soluble silica present which in the presence of soluble zirconia either has a tanning effect or enhances the tanning action of the zirconium. It appears that both the soluble and the insoluble silica are taken up to a considerable extent by the skins during tanning, the insoluble silica acting as a filler.

As illustrated by the following examples, it has been found that silicated sodium zirconyl sulfate is also effective in tanning other types of leather.

EXAMPLE 11

A tanning drum was loaded with 100 parts of drained calf skins which had been pickled to a pH of 1.8–2.0. There was also added 200 parts of water, 10 parts of sodium chloride and 19.8 parts of silicated sodium zirconyl sulfate containing 5 parts of soluble $ZrO_2$ and 2.9 parts total $SiO_2$ of which 0.67 part was water soluble $SiO_2$. After drumming for 3 hours the shrink temperature was found to be 189° F. Then 2 parts of anhydrous sodium acetate dissolved in 4.2 parts of water were added and drumming was continued for 20 minutes. The pH of the drum contents was then raised by adding a 3.5% solution of sodium bicarbonate to the drum in increments, drumming for 20 minutes after each addition, until the pH was 4.0–4.25. After standing in the drum overnight the tanned skins were horsed up, set out and shaved, then washed and thoroughly drained. 150 parts of water and 1 part of anhydrous sodium citrate were then added to the skins in the drum and the drum was rotated for 30 minutes before draining. The skins were then prepared for fat liquoring and finishing in the usual way. Chemical analysis of the leather showed that the leather had picked up 80% of the soluble $ZrO_2$ and 52.5% of the silica present in the tanning bath. The total percent increase in weight due to $ZrO_2$ and $SiO_2$ was 22.42% based on the original hide substance.

EXAMPLE 12

The procedure described in Example 11 was repeated, using, however, 26.0 parts of silicated sodium zirconyl sulfate, containing, per 100 parts drained skins, 6.5 parts of soluble $ZrO_2$ and 3.8 parts total $SiO_2$ of which 0.88 part were water soluble $SiO_2$. After drumming for 3 hours the shrink temperature was found to be 197° F. Chemical analysis of the finished leather showed that the leather had picked up 88% of the soluble $ZrO_2$ and 51% of the total silica present in the tanning bath. The percent increase in weight of the original hide substance due to pickup of $ZrO_2$ and $SiO_2$ was 28.46%.

EXAMPLE 13

A tanning drum was loaded with 100 parts of drained calf skins which had been pickled to a pH of 2.0. There was also added 200 parts of water, 10 parts of sodium chloride, and 24 parts of silicated sodium zirconyl sulfate containing 6.0 parts of soluble $ZrO_2$ and 3.54 parts total $SiO_2$ of which 0.81 part were water soluble. After drumming for 3 hours, the shrink temperature of the tanned skins was found to be 202° F. Then 2 parts of anhydrous sodium acetate dissolved in 4.2 parts of water was added and drumming was continued for 20 minutes. The pH of the drum contents was raised by adding a 5.0% solution of sodium bicarbonate to the drum in increments, drumming for 20 minutes after each addition, until the pH was 4.0–4.25. After standing in the drum overnight the tanned skins were horsed up, set out, shaved, then washed and drained. 150 parts of water and 1 part of anhydrous sodium citrate were then added to the skins in the drum and the drum was rotated for 30 minutes before draining. The skins were then prepared for fat liquoring and finishing in the usual way.

In the further treatment of the tanned skins produced in Examples 8–13 and the kid skins tanned with silica-free sodium zirconyl sulfate for comparison, a standard commercial fat liquor of the type used for white leather was used. This had a sulfated sperm oil and neat's-foot oil base with 40% water. Conventional fat-liquoring procedure was used and the quantity of fat liquor was adjusted to give 4.5% in the leather. Following the fat liquoring the leather was given further conventional treatment including drying and finishing. It will be understood that other fat liquors suitable for white or light colored leather may be used with satisfactory results.

As will be seen from the foregoing examples, tanning baths containing silicated sodium zirconyl sulfate are aqueous systems that may contain soluble $ZrO_2$ in an amount from about 3.5 to 6.5 parts per 100 parts of drained, pickled skins or hides and soluble $SiO_2$ in an amount from about 0.5 to 0.9 parts per 100 parts of drained, pickled skins or hides. Although baths containing larger amounts of soluble $ZrO_2$, up to about 10.0 parts per 100 parts of skins, may be used, it is not indicated from experiments that such amounts are needed or are economical. Since the soluble $SiO_2$ contents of silicated sodium zirconyl sulfates varies somewhat, the soluble silica content of the tanning baths may vary between about 0.3–1.9 parts per 100 parts of drained skins. It will be understood that tanning baths containing silicated sodium zirconyl sulfate may also contain other conventional and known materials, such, for example, as sodium chloride, for various purposes. Also, of course, if desired, leather tanned by the present novel process can be retanned with suitable known materials.

The foregoing examples illustrate the tanning action of aqueous systems containing silicated sodium zirconyl sulfates with kid skins and calf skins only. However, excellent results have also been obtained with these compositions in tanning cow hide and it is obvious that such tannage is adapted for use with sheep skins and other kinds of animal skins and hides including reptile skins. Accordingly, in the appended claims the term "skins" is intended to have a broad, generic meaning. The quality of leathers produced by tanning with silicated sodium zirconyl sulfate has been judged to be very satisfactory with respect to appearance, feel, and strength. Leather so tanned is plumper than chrome-tanned leather from similar skins.

The silicated sodium zirconyl sulfate products are dry and non-gelatinous and can be inexpensively packed and shipped. They can be powdered to facilitate solution or dispersion in water. They contain a relatively high percentage of soluble $ZrO_2$. Because of their method of manufacture, they are low in cost. In fact, they are the lowest cost zirconium chemicals ever put on the market and are, therefore, of interest as intermediates for the production of other zirconium chemicals. In addition to the enumerated advantages, they are, as seen above, superior in tanning action.

In numerous places throughout the foregoing description and in the appended claims, reference is made to "soluble $ZrO_2$," "soluble silica," and "soluble $SiO_2$." Amounts and percentages of "soluble $ZrO_2$" and "soluble $SiO_2$" or "soluble silica" specified herein refer, respectively, to zirconium expresed as $ZrO_2$ and silica expressed as $SiO_2$ found by standard analytical procedures in the liquid obtained by filtering off undissolved material from a mixture of 4 parts of product with 100 parts of water after allowing ample time for solution of soluble matter.

In the foregoing description and the appended claims, parts, percentages, and ratios are by weight, if not otherwise specified.

This application is, in part, a continuation of copending application Serial No. 765,933, filed October 8, 1958, and now abandoned.

I claim:

1. A process for producing dry, non-gelatinous, silicated sodium zirconyl sulfate which consists essentially in mixing together sodium zirconium silicate and concentrated sulfuric acid in a molar ratio of acid to silicate of from about 1.5:1 to about 2.2:1 whereby a reaction occurs which results in the direct production of a dry, non-gelatinous, silicated sodium zirconyl sulfate substantially free of silica gel.

2. A process as set forth in claim 1 in which said molar ratio is from about 1.8:1 to about 2.2:1.

3. Dry- non-gelatinous silicated sodium zirconyl sulfate characterized by the presence of water soluble zirconium products equivalent to from about 24% to about 30% $ZrO_2$ content and from about 1% to about 5% water soluble silica and being substantially free of silica gel.

4. A dry, non-gelatinous silicated sodium zirconyl sulfate which has a composition within the following ranges: 27%–31% $ZrO_2$ (24%–30% $ZrO_2$ in water soluble form); 13%–16% $SiO_2$ (1%–5% $SiO_2$ in water soluble form); 34%–40% $SO_3$; 13%–16% $Na_2O$; 0.5%–4% $H_2O$ and substantially free of silica gel.

5. A tanning process which comprises treating pickled animal skins in an aqueous system with a silicated sodium zirconyl sulfate in an amount equivalent to from about 3.5 to 10.0 parts of soluble $ZrO_2$ per hundred parts of drained, pickled skins and from about 0.3 to 1.9 parts of soluble $SiO_2$ per hundred parts of drained, pickled skins, said silicated sodium zirconyl sulfate being characterized by the presence of water soluble zirconium products equivalent to from about 24% to about 30% $ZrO_2$ content and from about 1% to about 5% water soluble silica and being substantially free of silica gel.

6. A tanning process which comprises treating pickled animal skins in an aqueous system with a silicated sodium zirconyl sulfate in an amount equivalent per hundred parts of drained, pickled skins, to from about 3.5 to 6.5 parts of soluble $ZrO_2$ and from about 0.5 to 0.9 part of soluble $SiO_2$, said silicated sodium zirconyl sulfate being characterized by the presence of water soluble zirconium products equivalent to from about 24% to about 30% $ZrO_2$ content and from about 1% to about 5% water soluble silica and being substantially free of silica gel.

7. An aqueous tanning bath comprising silicated sodium zirconyl sulfate.

8. An aqueous tanning bath comprising silicated sodium zirconyl sulfate which has a composition within the following ranges: 27–31% $ZrO_2$ (24%–30% $ZrO_2$ in water soluble form); 13%–16% $SiO_2$ (1%–5% $SiO_2$ in water soluble form); 34%–40% $SO_3$; 13%–16% $Na_2O$; 0.5%–4% $H_2O$ and is substantially free of silica gel.

9. Leather tanned by treatment with a silicated sodium zirconyl sulfate in an aqueous system.

10. Leather tanned by treatment in an aqueous system with silicated sodium zirconyl sulfate which has a composition within the following ranges: 27%–31% $ZrO_2$ (24%–30% $ZrO_2$ in water soluble form); 13%–16% $SiO_2$ (1%–5% $SiO_2$ in a water soluble form); 34%–40% $SO_3$; 13%–16% $Na_2O$; 0.5%–4% $H_2O$ and is substantially free of silica gel.

References Cited in the file of this patent

UNITED STATES PATENTS 2,871,138    Linnell  ---------------- Jan. 27, 1959